United States Patent
Eatough et al.

(10) Patent No.: US 8,341,708 B1
(45) Date of Patent: Dec. 25, 2012

(54) SYSTEMS AND METHODS FOR AUTHENTICATING CREDENTIALS FOR MANAGEMENT OF A CLIENT

(75) Inventors: David A. Eatough, Herriman, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 880 days.

(21) Appl. No.: 11/468,255

(22) Filed: Aug. 29, 2006

(51) Int. Cl.
*G06F 21/00* (2006.01)

(52) U.S. Cl. .................. 726/5; 713/156; 713/175; 726/7

(58) Field of Classification Search .................. 726/4, 5, 726/6, 7, 11, 12, 14; 713/150, 155, 156, 713/168, 175; 709/220, 221, 222
See application file for complete search history.

(56) References Cited

U.S. PATENT DOCUMENTS

| | | | | |
|---|---|---|---|---|
| 6,052,785 A * | 4/2000 | Lin et al. | ............................. | 726/5 |
| 6,226,752 B1 * | 5/2001 | Gupta et al. | ....................... | 726/9 |
| 6,275,941 B1 * | 8/2001 | Saito et al. | ........................... | 726/2 |
| 6,353,886 B1 * | 3/2002 | Howard et al. | ............... | 713/156 |
| 6,668,322 B1 * | 12/2003 | Wood et al. | ....................... | 713/182 |
| 6,754,829 B1 * | 6/2004 | Butt et al. | ......................... | 726/8 |
| 7,032,110 B1 * | 4/2006 | Su et al. | ......................... | 713/156 |
| 7,039,812 B2 | 5/2006 | Kawan et al. | | |
| 7,082,297 B2 | 7/2006 | Tuomi et al. | | |
| 7,093,124 B2 | 8/2006 | Girard | | |
| 7,100,200 B2 | 8/2006 | Pope et al. | | |
| 2002/0031230 A1 * | 3/2002 | Sweet et al. | ................... | 380/278 |
| 2003/0033521 A1 * | 2/2003 | Sahlbach | ........................ | 713/156 |
| 2003/0120948 A1 * | 6/2003 | Schmidt et al. | ............... | 713/200 |
| 2003/0177364 A1 * | 9/2003 | Walsh et al. | ................. | 713/182 |
| 2004/0249885 A1 * | 12/2004 | Petropoulakis et al. | ....... | 709/204 |
| 2005/0010757 A1 * | 1/2005 | Bosler | ........................... | 713/156 |
| 2006/0200857 A1 * | 9/2006 | Yokota | .............................. | 726/6 |

OTHER PUBLICATIONS

Muller, N. J. 1997. Web-accessible network management tools. Int. J. Netw. Manag. 7, 5 (Sep. 1997), 288-297. DOI= http://dx.doi.org/10.1002/(SICI)1099-1190(199709/10)7:5<288::AID-NEM270>3.3.CO;2-V.*

Gollmann, D., "What do we mean by entity authentication?," Security and Privacy, 1996. Proceedings., 1996 IEEE Symposium on , vol., no., pp. 46-54, May 6-8, 1996 URL: http://ieeexplore.ieee.org/stamp/stamp.jsp?arnumber=502668&isnumber=10940.*

* cited by examiner

*Primary Examiner* — Eleni Shiferaw
*Assistant Examiner* — Hilary Branske
(74) *Attorney, Agent, or Firm* — Austin Rapp & Hardman

(57) ABSTRACT

A method and system for authenticating credentials for management of a client is disclosed. The credentials are provided to a verification application. The credentials are authenticated to an authentication application. A connection between the authentication application and a security server is established. An authenticator is invoked. Administrative rights associated with the credentials are verified. An authentication certificate indicating the administrative rights is sent to the client.

23 Claims, 8 Drawing Sheets

SYSTEMS AND METHODS FOR AUTHENTICATING CREDENTIALS FOR MANAGEMENT OF A CLIENT

TECHNICAL FIELD

The present invention relates generally to computers and computer-related technology. More specifically, the present invention relates to systems and methods for authenticating credentials for management of a client.

BACKGROUND

Many businesses and other types of organizations have a number of computers that are used by employees. These computers are often interconnected to form a computer network. One or more system administrators may be responsible for managing the organization's computers. A system administrator's responsibilities typically include installing and configuring new hardware and software, assigning user accounts and passwords, establishing security access levels, performing backups, troubleshooting reported problems, and so forth. In larger organizations, some of these tasks may be divided between different system administrators. A computer system that is used by a system administrator is commonly referred to as an administrative system. The computers (or other electronic devices) that a system administrator manages may be referred to as managed nodes (or clients).

Systems management software may be used to provide system administrators with the ability to remotely perform management operations on managed nodes. This remote management capability can save system administrators a significant amount of time because they are able to perform management operations on a managed node without the need to physically visit the managed node. An example of systems management software that is used by various organizations is the LANDesk® Management Suite. Systems management software enables a system administrator who is working at an administrative system to send management-related requests to managed nodes, which process and fulfill the requests.

If a system administrator desires to manage managed nodes on site, most systems management software requires the system administrator to provide credentials to indicate whether or not the system administrator has the necessary administrative rights to perform management operations on managed nodes. The credentials may then be authenticated to verify the administrative rights associated with the system administrator's credentials.

Unfortunately, authentication tools may be less effective when only basic authentication is used. When ineffective or less effective authentication occurs, the security of the managed node may be breached and administrators without the necessary administrative rights may be allowed to perform management operations on the managed node.

System administrators are under a tremendous amount of pressure to perform their duties in an efficient and productive manner and to ensure that only administrators with the appropriate authorization are performing management operations on the managed nodes. Accordingly, benefits may be realized by improved systems and methods for authenticating the credentials associated with a system administrator for management of a client.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
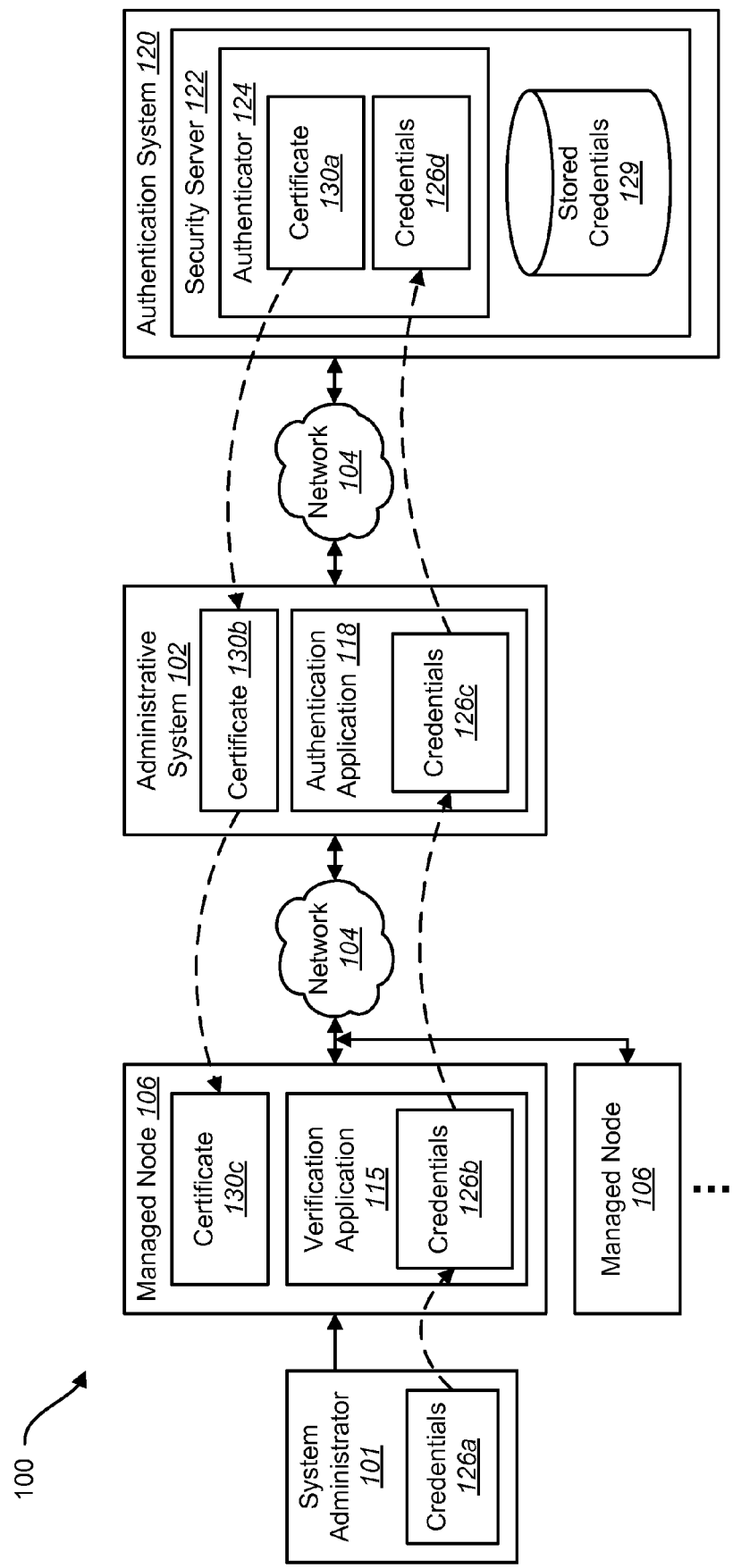
FIG. 1 is a block diagram illustrating an exemplary environment in which embodiments may be practiced, which includes an administrative system and a plurality of managed nodes.

A method and system for authenticating credentials for management of a client is disclosed. The credentials are provided to a verification application. The credentials are authenticated to an authentication application. A connection between the authentication application and a security server is established. An authenticator is invoked. Administrative rights associated with the credentials are verified. An authentication certificate indicating the administrative rights is sent to the client.

The authenticator may use a challenge/response authentication protocol. In an additional embodiment, the authenticator may implement an operating system based authentication protocol. The authenticator may further use a hyper-text transfer protocol authentication mechanism. In one embodiment, the authenticator may include a web service. The authenticator may be implemented on a domain controller.

In one embodiment, the credentials may include a username and a password. The username and the password may be associated with the administrative rights of a system administrator.

In one embodiment, the certificate is sent to a management agent. A limited rights authentication certificate may be issued to the client indicating the limited administrative rights associated with the credentials.

In one embodiment, a connection may be established by implementing an internet based management gateway application. In an additional embodiment, a connection may be established by implementing a secure sockets layer connection and an internet based management gateway application. A secure sockets layer connection may be established between the client and the authentication application.

In one embodiment, the credentials are provided on a managed node and the administrative rights may be verified by a web service. In one embodiment, the web service may use a domain controller using a challenge/response authentication protocol. The authentication certificate may be sent to the manage node. The communications between the managed node and the domain controller may be sent via a network that includes a management gateway.

A computer system that is configured to implement a method for authenticating credentials for management of a client is also disclosed. The computer system includes a processor and memory in electronic communication with the processor. Instructions are stored in the memory. A connection between an authentication application and a security server on the computer system is established. An authenticator on the computer systems is invoked. Credentials form the authentication application are received. Administrative rights associated with the credentials are verified. An authentication certificate indicating the administrative rights is sent.

A computer-readable medium comprising executable instructions for implementing a method for authenticating credentials for management of a client is also disclosed. A connection between an authentication application and a security server is established. An authenticator is invoked. Credentials from the authentication application are received. Administrative rights associated with the credentials are verified. An authentication certificate indicating the administrative rights associated with the credentials is issued to the client.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 illustrates an exemplary environment 100 in which embodiments may be practiced. A system administrator 101 may desire to access a managed node 106 onsite in order to perform management functions on the node 106. Management functions may include installing new software on the managed node 106, running diagnostic tests on the managed node 106, etc. As illustrated, the environment 100 may include multiple managed nodes 106.

Before the system administrator 101 is allowed to manage the managed node 106, the managed node 106 must receive a certificate which serves to verify that the system administrator 101 is authorized to perform management operations. The system administrator 101 may be associated with one or more credentials 126A which may be used by the managed node 106 to obtain the certificate. The credentials 126A may include a username and password associated with the system administrator 101. The system administrator 101 provides the credentials 126A to a verification application 115 on the managed node 106. In one embodiment, the verification application 115 is a broker configuration application which serves to receive and authenticate the credentials 126B. Once the verification application 115 receives the credentials 126B the application 115 may establish a connection with an administrative system 102 over a network 104. The administrative system 102 may include an authentication application 118. In one embodiment, the connection between the verification application 115 and the administrative system 102 includes a Secure Sockets Layer (SSL) connection. Once a connection has been established, the verification application 115 authenticates the credentials 126B to the authentication application 118.

In one embodiment, the authentication application 118 is a broker service application which serves to receive the credentials 126C by basic authentication. Once the authentication application 118 has received the credentials 126C, the authentication application 118 establishes a connection with an authentication system 120 over the network 104. The authentication system 120 may be located on the administrative system 102 or on another machine over the network. The network 104 may include the network of the local machine, a local area network (LAN), a wide area network (WAN), or any other network configuration. In one embodiment, the authentication system 120 includes a security server 122 which includes an authenticator 124. In an additional embodiment, the authenticator 124 may be located on another system, such as a domain controller, a Lightweight Directory Access Protocol (LDAP) directory, or another network operating software (NOS) authentication service. In one embodiment, the authenticator 124 may be a web service that serves to verify the administrative rights associated with the credentials 126D. Once the authentication application 118 establishes a connection with the authentication system 120, the authentication application 118 authenticates the credentials 126D to the authenticator 124.

The authenticator 124 may verify the administrative rights associated with the credentials 126D by executing an authentication method. As part of the method, the authenticator 124 may compare the credentials 126D with a database of stored credentials 129 included in the security server 122. In an additional embodiment, the authenticator 124 may communicate with a network based credentials system, such as the domain controller. The authentication method will be discussed below in greater detail. If the credentials 126D are verified, the authenticator issues a certificate 130A. The certificate 130A is sent to the administrative system 102 over the network 104. The administrative system 102 sends the certificate 130B to the managed node 106. Once the managed node 106 receives the certificate 130C, the system administrator 101 is allowed to perform management operations on the managed node 106.

Figure 2:
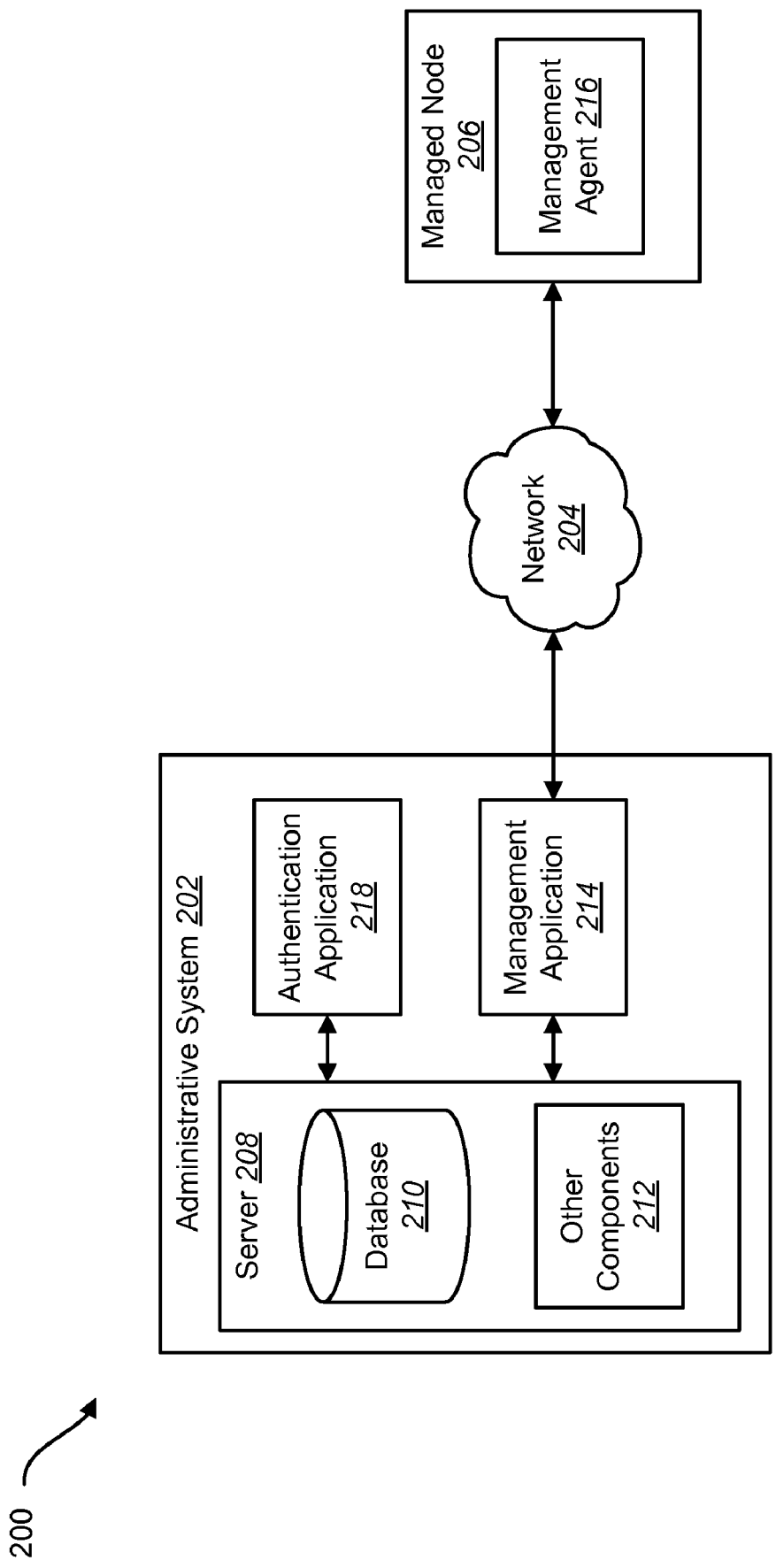
FIG. 2 is a block diagram of an administrative system and a managed node illustrating various authentication tools that facilitate management of a managed node.

FIG. 2 illustrates various authentication tools 200 that facilitate management of a managed node 206. The administrative system 202 may include a management server 208. The administrative system 202 may also include the authentication application 218. The server 208 may include a database 210 with information about the managed node 206 and also about other managed nodes (not shown) that are connected to the computer network 204. The database 210 may also include stored credentials associated with one or more system administrators. The credentials from the system administrators may also be stored on a network authentication system, such as the domain controller. The management server 208 may also include various other components 212 that are configured to perform tasks such as scheduling, handling alerts, and so forth. An example of a management server 208 that may be used is the core server for the LANDesk® Management Suite.

The administrative system 202 may also include a management application 214. The management application 214 may be used to perform various tasks related to the management of the managed node 206 and other managed nodes that are connected to the computer network 204. There are many different kinds of remote management operations that the system administrator 101 may desire the administrative system 202 to perform on the managed node 206. Some examples of remote management operations that may be performed by the administrative system 202 include problem resolution, remote control, software distribution, software license monitoring, operating system imaging and migration, IT asset management, and so forth. As part of performing these tasks, the management application 214 may connect to the management server 208 and query the management server 208 for information. An example of a management application 214 that may be used is the console application for the LANDesk® Management Suite.

The managed node 206 may include a management agent 216. The management agent 216 performs management-related tasks by connecting through the network 104 and requesting any outstanding managed tasks. In one embodiment, these tasks may have been previously requested from the management application 214. An example of a management agent 216 that may be used is the LANDesk® Management Agent.

Because many of the managed nodes will be located over the internet, it may be necessary to prevent unauthorized systems from connecting to the management administrative system 102 and requesting work. As previously explained, a certificate may be required before the manage node 106 is permitted to request management operations from the administrative system 102. In one embodiment, the certificate is used by the management agent 216 in order to authenticate the managed node 106 as a valid managed node to the administrative system 102. If the administrative system 102 authenticates the certificate, the administrative system 102 may send instructions from the management application 214 over the network 204 regarding the desired management operation. Part of receiving these instructions, the management agent 216 may receive one or more management commands on the managed node 206. Upon receiving and processing the management command(s), the management agent 216 may perform the desired management operation. The management agent 216 may send a report back to the management application 214 regarding whether the management operation was successfully performed.

However, as indicated above, authentication tools may be less effective when only basic authentication techniques are utilized, such as only comparing received credentials with stored credentials within a database. Ineffective or less effective authentication tools may compromise the security of the particular managed node 206 by allowing a managed node 206, which is not authorized, to receive administrative commands receiving those instructions. This becomes particularly important when these commands may result in software applications being installed on systems that should not receive the application. The authentication system 120 may be used to authenticate the credentials associated with the managed node 106.

Figure 3A:
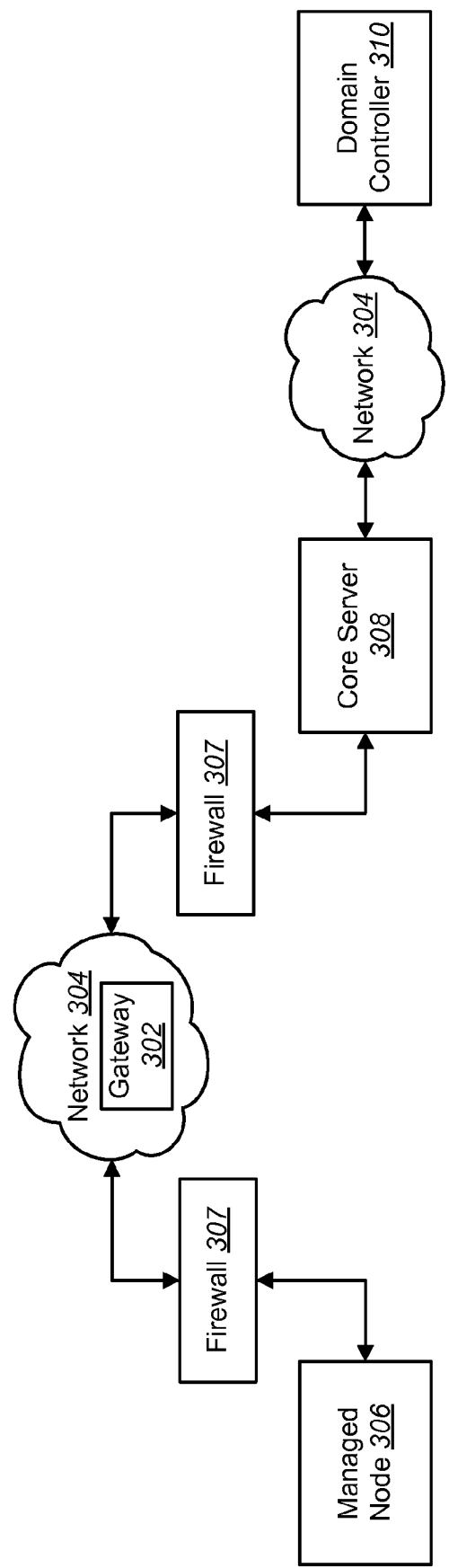
FIG. 3a is a block diagram of one embodiment of an authentication system.

FIG. 3a illustrates an example of the authentication system 120 that is configured to authenticate and verify the credentials of a managed node 306 attempting to request management commands from the core server 308. In one embodiment, the system administrator 101 desires to log into the administrative system 102 remotely from the managed node 306 in order to perform management operations on the managed node 306 or configure the managed node 306 with a certificate 130C. The managed node 306 may communicate over the network 304 with a core server 308. In one embodiment, the core server 308 is included within the administrative system 102. In a further embodiment, the core server 308 may include the authentication application 218. The managed node 306 may receive credentials from the system administrator 101 and may communicate the credentials to the core server 308. The managed node 306 may communicate the credentials to the core server 308 through a plurality of firewalls 307.

The network 304 may include a management gateway 302 which serves to control the managed node's 306 access to other networks. An example of the management gateway 302 that may be used is the LANDesk® Management Gateway Service. The managed node 306 may not authenticate using domain credentials (or other NOS related credentials) because it may not have access to a domain controller 310. The managed node 306 may communicate the credentials of the administrator 101 over an SSL channel using basic authentication. Once the core server 308 receives the credentials, it may use the credentials to authenticate to a desired web service or other management application. This authentication may be done using operating system (OS) based credentials (such as Windows® NT LAN Manager (NTLM) authentication) based on the information supplied by the managed node 306 by basic authentication over the SSL connection. In other words, the core server 308 uses the username/pas sword to perform an NTLM authentication. The core server 308 may then establish a connection with the domain controller 310 and verify the credentials to the domain controller 310. The domain controller 310 may be included in the authentication system 120. In one embodiment, the domain controller 310 is a Windows® NT domain controller. Because the managed node 306 does not have direct access to the domain controller 310 it cannot directly access the authenticator 124, or even directly access the authenticator 124 via a proxy, and perform the necessary authentication. In one embodiment, the authentication system 120 allows the user name space to be extended to nodes that are managed across the Internet using the management gateway 302. The authentication system 120 may also eliminate the need to maintain a secondary or proprietary user name space. The authenticator 124 included in the domain controller 310 may authenticate the credentials by performing an authentication method discussed below regarding FIG. 4.

Figure 3B:
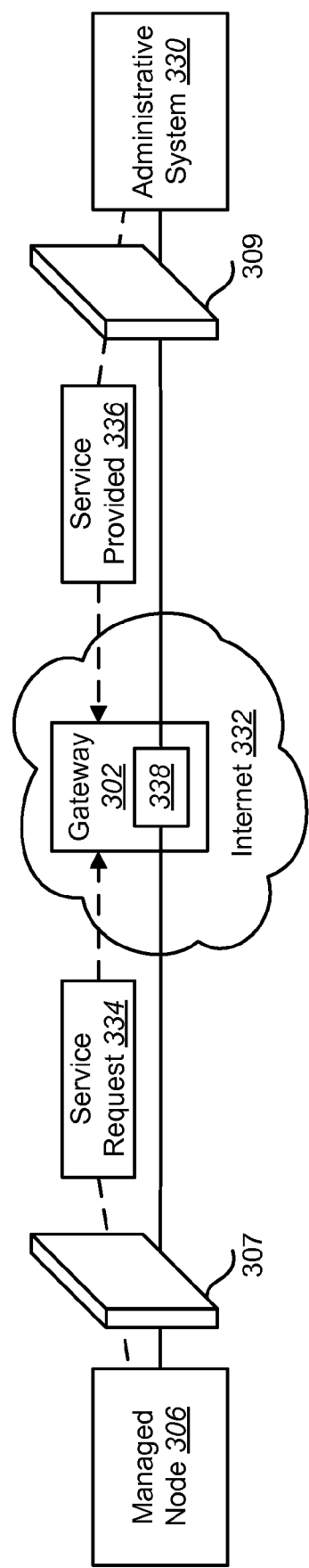
FIG. 3b is a block diagram illustrating one embodiment of a management gateway.

FIG. 3b is a block diagram illustrating one embodiment of the management gateway 302. The management gateway 302 may serve to perform management operations over the internet 332. In one embodiment, the management operations may include the administrative system 330 and the managed node 306. In an additional embodiment, the administrative system 330 and the managed node 306 may be behind individual firewalls 307, 309.

The administrative system 330 may schedule management operations to be performed by providing a services provided request 336 to the gateway 302. The administrative system 330 may connect to the gateway 302 using a secure hyper-text transfer protocol (HTTPS) in order to preserve privacy in the internet 332. The administrative system 330 may establish a connection with the gateway 302 and communicate a services provided request 336. The services provided request 336 may include the types of services the administrative system 330 provides, such as remote control, application policy management, etc.

The managed node 306 may also establish a connection with the gateway 302. The managed node 306 may provide a service request 334 which may include a request for a service. The service may include remote control, application policy management, etc. The gateway 302 may match the two connections, or in other words, the gateway 302 may join 338 the services provided request 336 from the administrative system 330 to the services request 334 of the managed node 306. The joining 338 of these two requests may create a long session which may allow the services request 334 from the managed node 306 to be sent to the administrative system 330.

Figure 4:
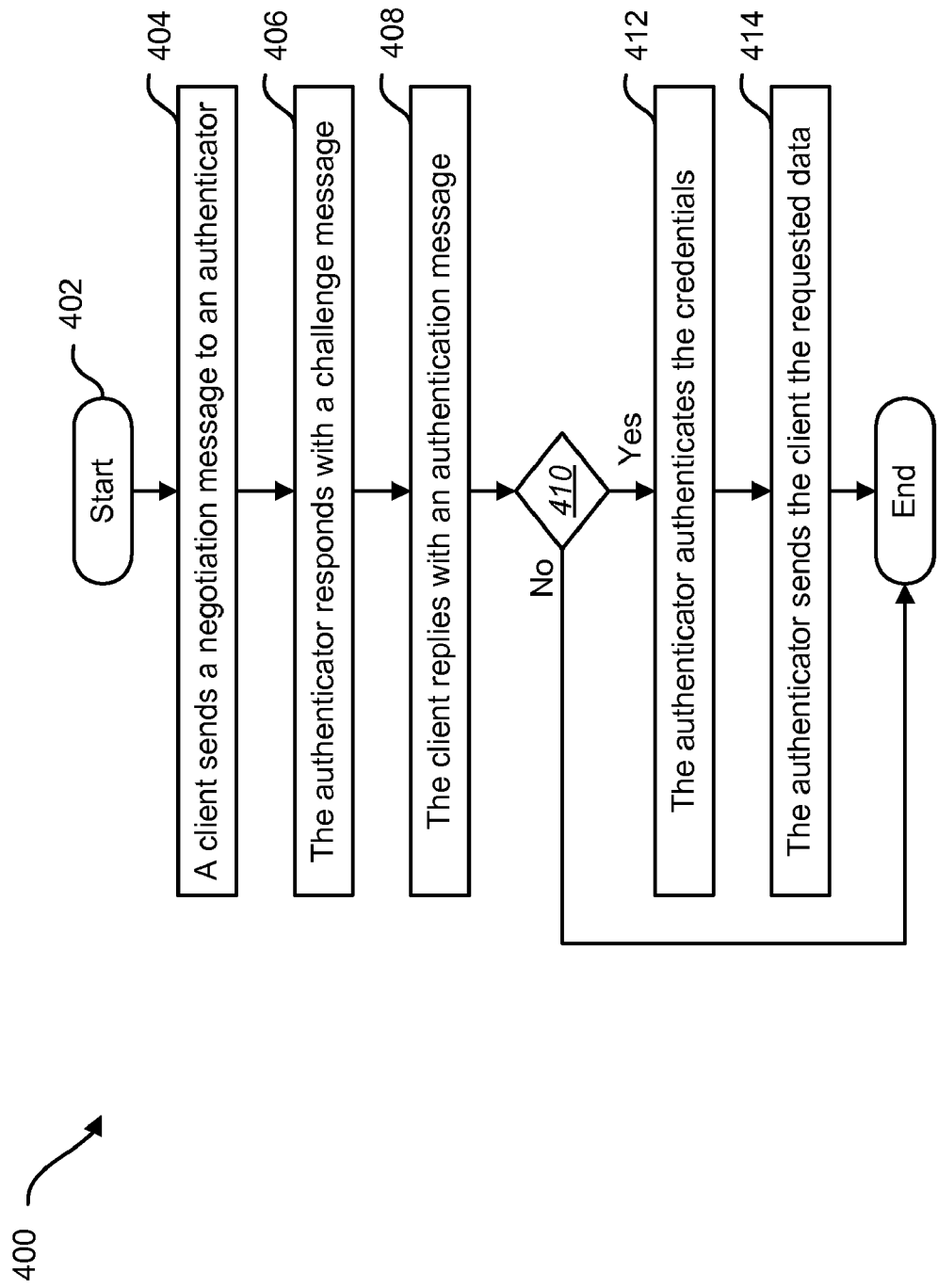
FIG. 4 is a flow diagram which illustrates an embodiment of an authentication method.

FIG. 4 is an example of one embodiment of an authentication method 400. In one embodiment, the authentication method 400 employs a challenge-response mechanism. The method 400 may be used by the authenticator 124 to verify the credentials of the system administrator 101. The method 400 starts 402 with a client sending 404 a negotiation message to the authenticator 124. In one embodiment, the client is the managed node 106. The negotiation message may include a request to authenticate the certificate 130C from the managed node. The authenticator 124 may respond 406 to the negotiation message with a challenge message. The client replies 408 with an authentication message. The authentication message may demonstrate that the managed node 106 has a private key associated with the certificate 130C. The authenticator 124 may verify that the managed node 106 has a certificate with the credentials needed to access the management services.

If the authentication message, with the credentials, includes the correct response 410 to the challenge message, the authenticator 124 authenticates 412 the credentials and verifies that the managed node 106 is a valid managed system and can receive management requests from the administrative system 102. Once the authenticator 124 has verified the credentials, the authenticator may send 414 data to the client. For example, the authenticator 124 may send the client an application policy management request which results in the managed node 106 installing software. If, however, the authentication message, with the credentials, does not 410 respond correctly to the challenge message, the method 400 does not continue and the authenticator 124 does not send any management commands to the client.

Figure 5:
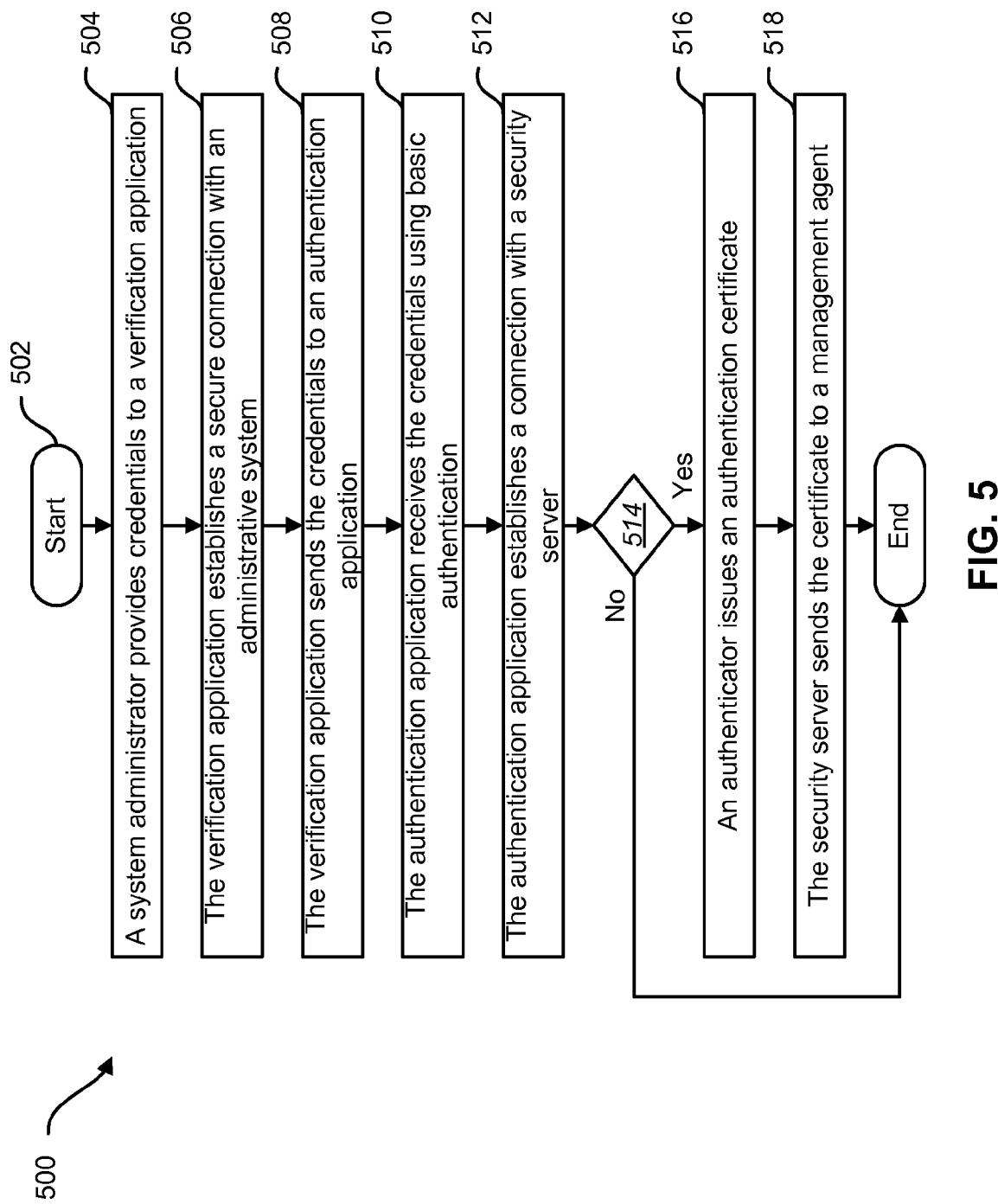
FIG. 5 is a flow diagram which illustrates an embodiment of a method for issuing an authentication certificate.

The method 400 outlined above may require a certificate. FIG. 5 is one embodiment of an authentication certificate issuing method 500. When a system administrator of a managed node 206 attempts to instruct the management agent 216 to install software, software updates, or manage the node 206 in any other way, a certificate 130C may be required to be installed on the management agent 216 so that it may be authenticated as a valid managed node 106. In one embodiment, the management agent 216 may not receive management commands without the certificate 130C. The certificate 130C may prevent unauthorized devices with access to the Internet, for example, from being able to send/receive data to/from the management server 208.

The method 500 starts 502 and the administrator may be required to provide 504 credentials to the verification application 115. The verification application 115 may then establish 506 a secure connection with the management server 208 within the administrative system 202. In one embodiment, the verification application 115 establishes a secure socket layer (SSL) connection with the management server 208. In another embodiment, the connection may be established using a gateway server to allow the connection to occur over multiple firewalls. An SSL connection provides endpoint authentication and secure communications over the Internet. In one embodiment, the management server 208 is authenticated while the managed node 206 remains unauthenticated. To establish an SSL connection, mutual authentication of both the management server 208 and the managed node 206 is required. In one embodiment, mutual authentication is achieved by utilizing a public key infrastructure which enables the managed node 206 and the management server 208 to be authenticated to each other.

Once the secure SSL connection is established between the managed node 206 and the management server 208, the verification application 115 sends 508 the credentials associated with the system administrator to the authentication application 218. The authentication application 218 receives 510 the credentials using basic authentication. In one embodiment, basic authentication is permitted because the communication between the managed node 206 and the management server 208 is established over the SSL connection.

Using the credentials obtained via basic authentication, the authentication application 218 establishes 512 a connection with the security server 122 using OS authentication techniques such as NTLM. After the connection between the authentication application 218 and the security server 122 is established, the authenticator 124 is invoked. The authenticator 124 verifies 514 whether or not the authenticated credentials have the necessary administrative rights to enable the administrator to manage the node. In one embodiment, this verification 514 is completed by performing a challenge/response authentication protocol as explained in FIG. 4. In an additional embodiment, the verification 514 is performed by using Hyper Text Transfer Protocol (HTTP) compatible authentication. If the credentials do not have the necessary rights, the authenticator 124 does not issue a certificate and the method 500 ends. If the authenticated credentials have the necessary rights, the authenticator 124 issues 516 an authentication certificate. The certificate is sent 518 to the management agent 216 within the managed node 206. The receipt of the certificate permits the management agent 216 to execute the commands provided by the administrative system 102, such as the LANDesk® Management Suite core server. The authentication certificate allows the managed node 206 to be managed by the administrator when the managed node 206 is located in a remote location and cannot directly access the security server 122.

In an additional embodiment, the authenticator 124 may issue a certificate that allows the system administrator 101 limited rights to manage the node 206. For example, the authentication of the credentials may reveal that the system administrator 101 only has administrative rights to install software updates for existing software applications presently installed on the managed node 206, and that the administrator does not have the necessary rights to install new software applications on the managed node 206. The authenticator 124 may issue the appropriate authentication certificate and the certificate may be sent to the management agent 216 within the managed node 206. The certificate may be used to limit the management services that the managed node 106 may request from the management system.

Figure 6:
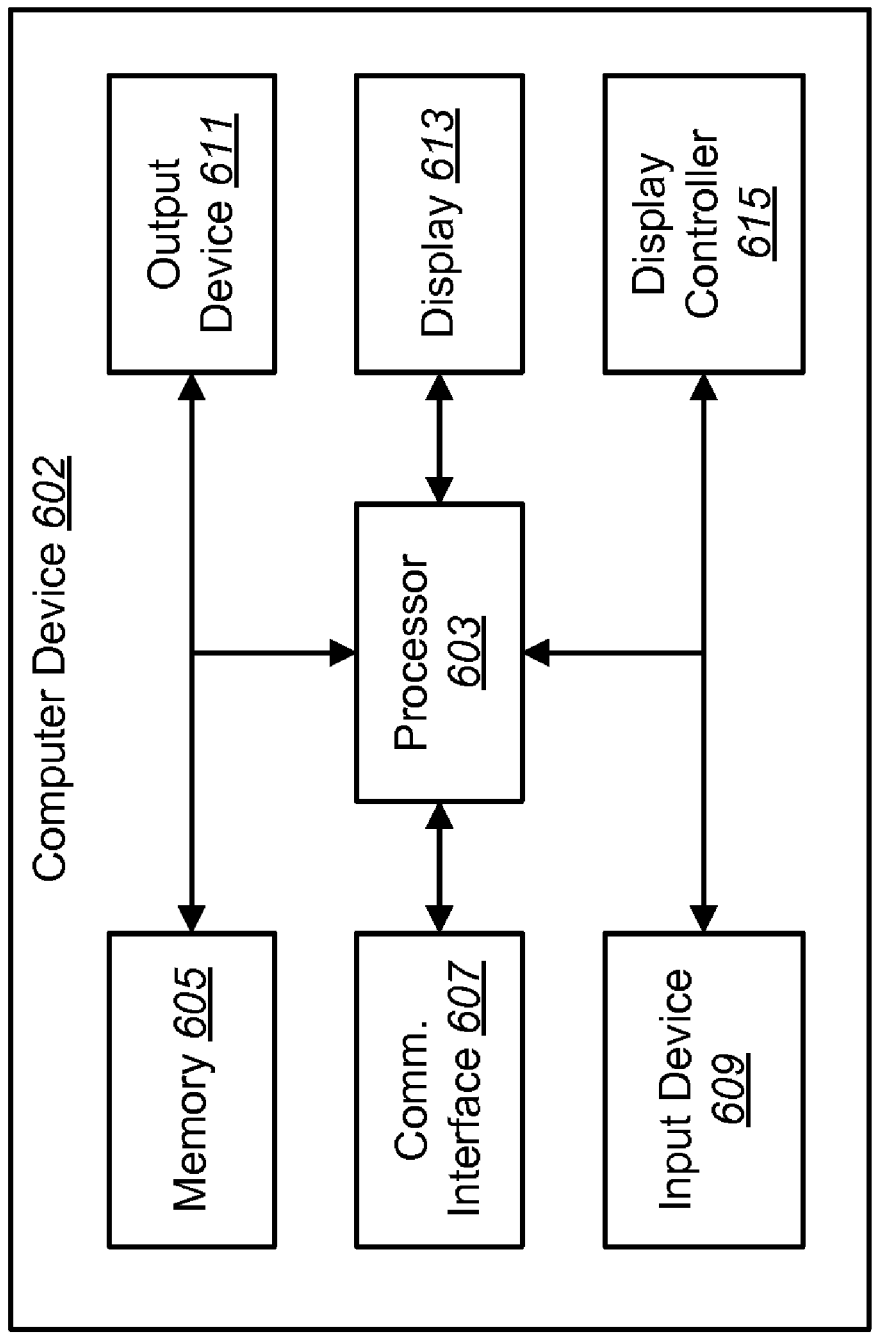
FIG. 6 is a block diagram illustrating the major hardware components typically utilized in an administrative system and/or managed node.

FIG. 6 illustrates various components that may be utilized in a computing device 602 that may be used as an administrative system and/or a managed node. The illustrated components may be located within the same physical structure or in separate housings or structures.

The computing device 602 includes a processor 603 and memory 605. The processor 603 controls the operation of the computing device 602 and may be embodied as a microprocessor, a microcontroller, a digital signal processor (DSP) or other device known in the art. The processor 603 typically performs logical and arithmetic operations based on program instructions stored within the memory 605.

The computing device 602 typically also includes one or more communication interfaces 607 for communicating with other electronic devices. The communication interfaces 607 may be based on wired communication technology, wireless communication technology, or both. Examples of different types of communication interfaces 607 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 602 typically also includes one or more input devices 609 and one or more output devices 611. Examples of different kinds of input devices 609 include a keyboard, mouse, microphone, remote control device, button, joystick, trackball, touchpad, lightpen, etc. Examples of different kinds of output devices 611 include a speaker, printer, etc. One specific type of output device which is typically included in a computer system is a display device 613. Display devices 613 used with embodiments disclosed herein may utilize any suitable image projection technology, such as a cathode ray tube (CRT), liquid crystal display (LCD), light-emitting diode (LED), gas plasma, electroluminescence, or the like. A display controller 615 may also be provided, for converting data stored in the memory 605 into text, graphics, and/or moving images (as appropriate) shown on the display device 613.

Of course, FIG. 6 illustrates only one possible configuration of a computing device 602. Various other architectures and components may be utilized.

Figure 7:
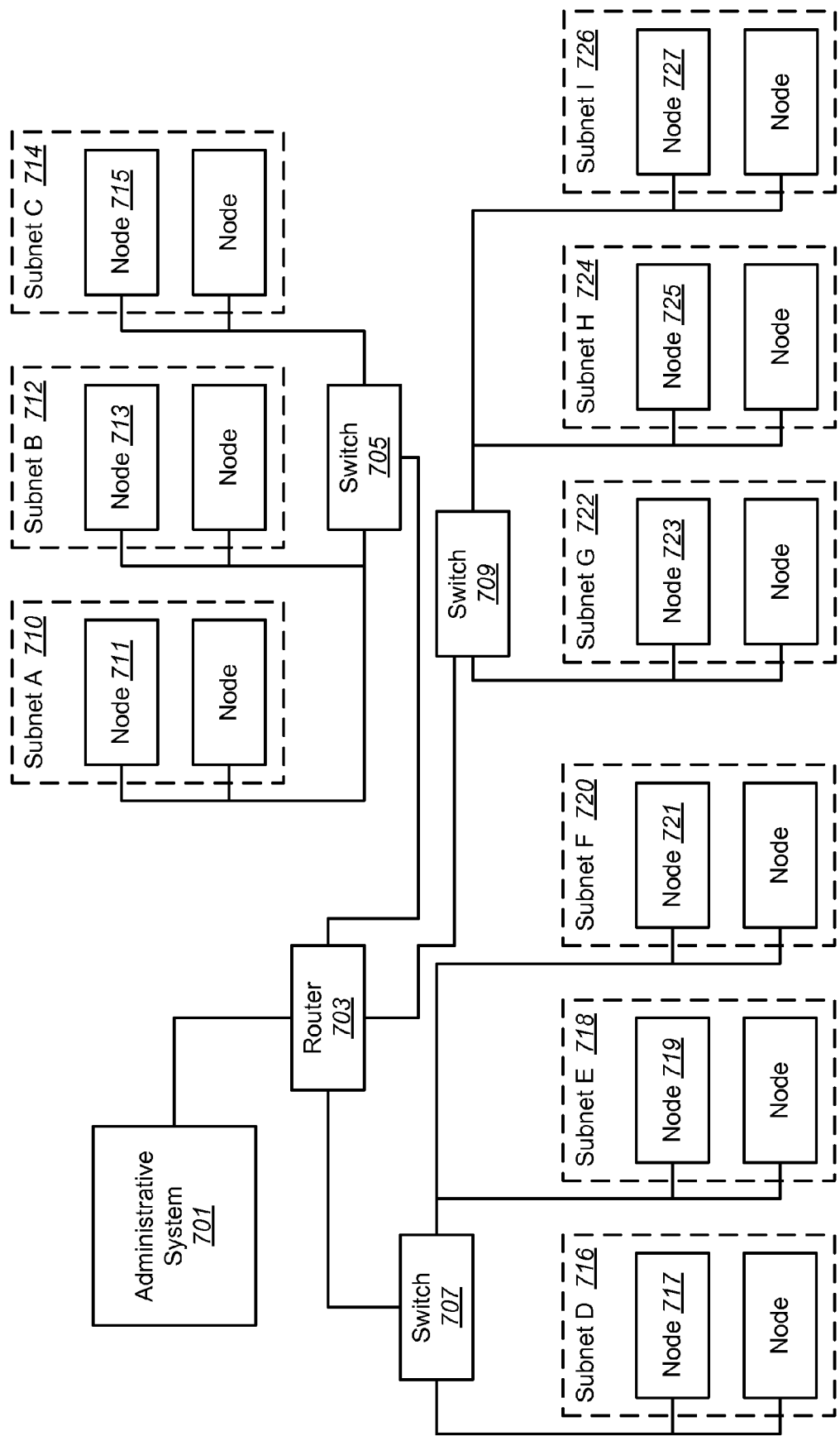
FIG. 7 is a block diagram illustrating a computer network on which the present systems and methods may be implemented.

FIG. 7 is an exemplary block diagram illustrating a computer network on which the present systems and methods may be implemented. In FIG. 7, an administrative system 701 connects to a router 703. The administrative system 701, or administrative node 701, may be any computer or computing device that has been configured to, or is being used for, receiving notifications from one or more monitors.

The router 703 may be connected to three switches: a first switch 705, a second switch 707 and a third switch 709. Each switch 705, 707, and 709 connects to three subnets. The first switch 705 connects to three subnets 710, 712, and 714. The second switch 707 connects to three subnets 716, 718, and 720. The third switch 709 connects to three subnets 722, 724, and 726. A network group may be embodied in a wide variety of configurations and may include a local area network, a subnet 710, 712, and 714, or a group of subnets 710, 712, and 714. The network nodes or elements 711, 713, 715, 717, 719, 721, 723, 725 and 727 represent computer systems or devices on the computer network. One or more of the nodes may use embodiments of the systems and methods described herein. The network may include both wired and wireless connections to nodes or elements 711, 713, 715, 717, 719, 721, 723, 725 and 727 within the network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for authenticating credentials for management of a node, the method being implemented by a computer system, the method comprising:
    providing the credentials to a verification application on a managed node;
    establishing a secure connection between the managed node and an authentication application located remotely from the managed node;
    sending the credentials via the secure connection;
    authenticating the credentials to the authentication application via basic authentication, wherein the credentials are sent via the secure connection before they are authenticated;
    establishing a connection between the authentication application and a security server using an authentication procedure that is different from the authentication used with the secure connection;
    invoking an authenticator on the security server;
    receiving the credentials at the authenticator from the authentication application;
    verifying administrative rights associated with the credentials using the authenticator on the security server; and
    sending, from the authenticator, an authentication certificate indicating the administrative rights associated with the credentials to the managed node,
    wherein both the secure connection and the connection are used for authenticating the managed node such that the managed node does not have direct access to the authenticator.

2. The method of claim 1, wherein verifying the administrative rights is performed using the authentication procedure that is different from the authentication used with the secure connection, wherein this different authentication procedure comprises the authenticator using a challenge/response authentication protocol.

3. The method of claim 1, wherein verifying the administrative rights is performed using the authentication procedure that is different from the authentication used with the secure connection, wherein this different authentication procedure comprises the authenticator implementing an operating system based authentication protocol.

4. The method of claim 1, wherein verifying the administrative rights is performed using the authentication procedure that is different from the authentication used with the secure connection, wherein this different authentication procedure comprises the authenticator using a hyper-text transfer protocol authentication mechanism.

5. The method of claim 1, wherein the authenticator comprises a web service.

6. The method of claim 1, wherein the authenticator is implemented on a domain controller.

7. The method of claim 1, wherein the credentials comprise a username and a password.

8. The method of claim 7, further comprising associating the username and the password with the administrative rights of a system administrator.

9. The method of claim 1, further comprising sending the certificate to a management agent.

10. The method of claim 1, further comprising issuing a limited rights authentication certificate to the managed node indicating the limited administrative rights associated with the credentials.

11. The method of claim 1, wherein establishing a connection comprises implementing an internet based management gateway application.

12. The method of claim 1, wherein establishing a secure connection comprises implementing a secure sockets layer connection and an internet based management gateway application.

13. The method of claim 1, wherein the administrative rights are verified by a web service using a domain controller using a challenge/response authentication protocol, and wherein the authentication certificate is sent to the managed node.

14. The method of claim 13, wherein communications between the managed node and the domain controller are sent via a network that comprises a management gateway.

15. A computer system that is configured for authenticating credentials for management of a client, the computer system comprising:
    a processor; memory in electronic communication with the processor;
    instructions stored in the memory, the instructions being executable to:
        authenticate credentials at an authentication application via basic authentication, wherein the credentials are received via a secure connection before they are authenticated;
        establish a connection between the authentication application located remotely from the client and a security server on the computer system, wherein the security server comprises an authenticator, wherein the connection is established using an authentication procedure that is different from the authentication used with the secure connection;
        invoke the authenticator on the computer system;
        receive credentials at the authenticator from the authentication application, wherein the credentials were previously received from the client and were sent from the authentication application to the authenticator;
        verify administrative rights associated with the credentials using the authenticator on the security server; and
        send an authentication certificate indicating the administrative rights associated with the credentials to the client, wherein both the secure connection and the connection are used for authenticating the client such that the client does not have direct access to the authenticator.

16. The system of claim 15, wherein the verification of the credentials is performed using the authentication procedure that is different from the authentication used with the secure connection, wherein this different authentication procedure comprises a challenge/response authentication protocol.

17. The system of claim 15, wherein the verification of the credentials is performed using the authentication procedure that is different from the authentication used with the secure connection, wherein this different authentication procedure comprises a hyper-text transfer protocol authentication mechanism.

18. The system of claim 15, wherein the secure connection implements a secure sockets layer connection and an internet based management gateway application.

19. The system of claim 15, wherein the authenticator comprises a web service.

20. The system of claim 15, wherein the authenticator is implemented on a domain controller.

21. A non-transitory computer-readable medium comprising executable instructions for authenticating credentials for management of a client, the executable instructions being executable to:
provide credentials to a verification application on the client;
establish a secure connection between the client and an authentication application located remotely from the client;
send the credentials via the secure connection;
authenticate the credentials to the authentication application via basic authentication, wherein the credentials are sent via the secure connection before they are authenticated;
establish a connection between the authentication application and a security server using an authentication procedure that is different from the authentication used with the secure connection, wherein the security server comprises an authenticator;
invoke the authenticator on the security server;
receive credentials at the authenticator from the authentication application, wherein the credentials were previously received from the client and were sent from the authentication application to the authenticator;
verify administrative rights associated with the credentials using the authenticator on the security server; and
issue, by the security server, an authentication certificate indicating the administrative rights associated with the credentials to the client,
wherein both the secure connection and the connection are used for authenticating the client such that the client does not have direct access to the authenticator.

22. The non-transitory computer-readable medium of claim 21, wherein the executable instructions that are executable to authenticate the credentials comprise executable instructions that are executable to authenticate using the authentication procedure that is different from the authentication used with the secure connection, wherein this different authentication procedure uses a challenge/response authentication protocol.

23. The non-transitory computer-readable medium of claim 21, wherein the executable instructions that are executable to establish a secure connection comprise executable instructions that are executable to implement a secure sockets layer connection and an internet based management gateway application.

* * * * *

UNITED STATES PATENT AND TRADEMARK OFFICE
CERTIFICATE OF CORRECTION

PATENT NO.       : 8,341,708 B1
APPLICATION NO.  : 11/468255
DATED            : December 25, 2012
INVENTOR(S)      : Eatough et al.

Page 1 of 1

It is certified that error appears in the above-identified patent and that said Letters Patent is hereby corrected as shown below:

In the Specification

In column 6, line 66 please delete "username/pas sword" and replace it with --username/password--.

Signed and Sealed this
Twenty-second Day of October, 2013

Teresa Stanek Rea
*Deputy Director of the United States Patent and Trademark Office*